United States Patent [19]
Davis et al.

[11] 3,956,885
[45] May 18, 1976

[54] ELECTROTHERMAL REACTOR

[75] Inventors: Walter S. Davis, Salem, N.H.; T. Kent Pugmire, Carlisle, Mass.

[73] Assignee: Avco Corporation, Cincinnati, Ohio

[22] Filed: Sept. 3, 1974

[21] Appl. No.: 502,906

[52] U.S. Cl. .................. 60/39.46 M; 60/200 R; 60/203; 60/258; 60/265
[51] Int. Cl.² ................ F02G 1/02; F02K 9/02
[58] Field of Search .......... 60/39.46 M, 200 R, 265, 60/203, 258, 39.74 A

[56] References Cited
UNITED STATES PATENTS

| | | | |
|---|---|---|---|
| 2,977,755 | 4/1961 | Geckler et al. | 60/39.46 M |
| 2,999,358 | 9/1961 | Zwick | 60/39.46 M |
| 3,059,429 | 10/1962 | Bjerklie et al. | 60/39.46 M |
| 3,149,460 | 9/1964 | Rocca | 60/39.46 M |
| 3,169,368 | 2/1965 | Munding | 60/265 |
| 3,568,445 | 3/1971 | Munding et al. | 60/265 |
| 3,640,072 | 2/1972 | Kayser | 60/265 |

*Primary Examiner*—William L. Freeh
*Assistant Examiner*—Robert E. Garrett
*Attorney, Agent, or Firm*—Charles M. Hogan; Abraham Ogman

[57] ABSTRACT

An electrothermal reactor is provided to control the decomposition of chemical compounds and mixes and generate a gas flow. The reactor embodies a reaction chamber which has an electrical heat source. Means are provided to inject the chemical compounds and mixes into the chamber such that the compounds will vaporize. The heat source raises the temperature within the chamber to the reaction temperature wherein the chemical compounds and mixes react, thereby releasing chemical energy and producing a gas flow of the reaction products.

13 Claims, 8 Drawing Figures

U.S. Patent  May 18, 1976  3,956,885
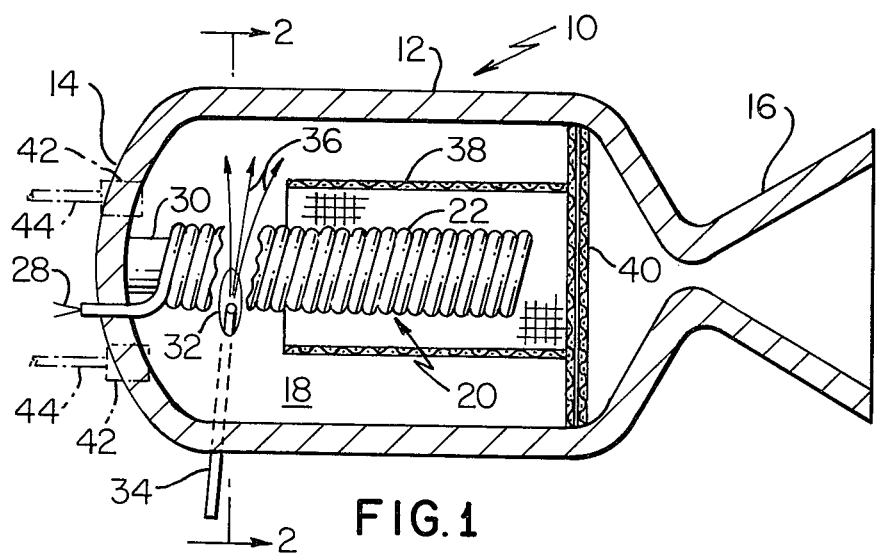
FIG. 1
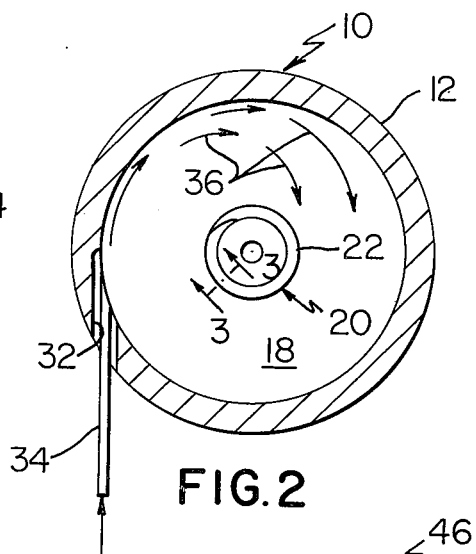
FIG. 3
FIG. 2
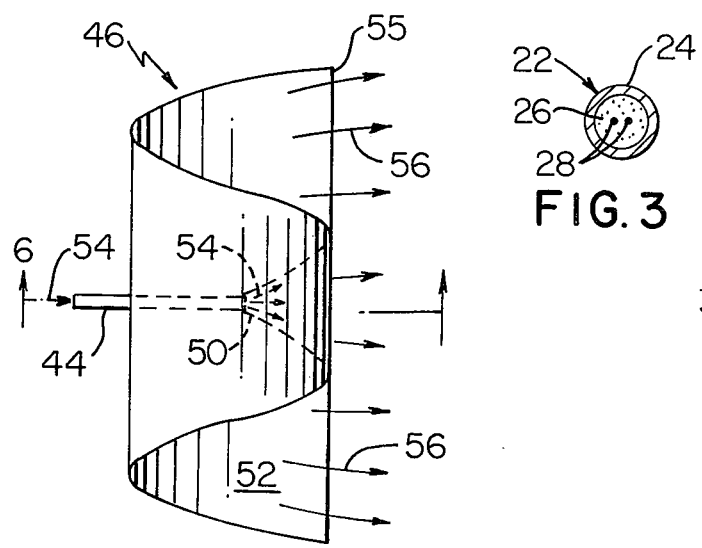
FIG. 5
FIG. 4
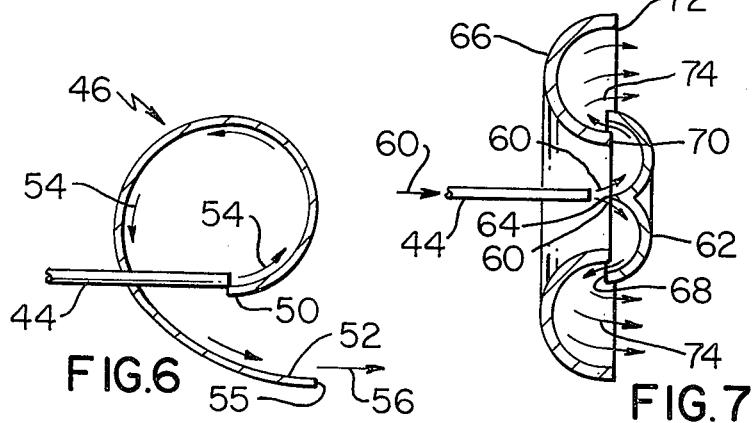
FIG. 6
FIG. 7
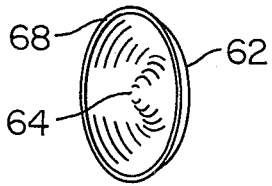
FIG. 8

ELECTROTHERMAL REACTOR

BACKGROUND OF THE INVENTION

This invention relates generally to an electrothermal reactor to provide controlled decomposition of chemical compounds and mixes such as hydrazine, hydrazine blends and monomethyl hydrazine with minimal use of hot and/or catalytic surfaces.

The use of hydrazine type fuels as a source of energy has been known for quite sometime. When hydrazine liquid is caused to react, it molecularly dissociates forming hydrogen, nitrogen and ammonia with intermediate combinations accompanied by the exothermic release of a great deal of energy. Dissociation of hydrazine blends produce related reaction products and exothermic energy release. As the hydrazine will generate a large quantity of hot gas, numerous areas of applications have been derived for such fuel uses. As an example, the military arsenal includes a number of munitions incorporating hydrazine assisted power supplies, propulsion systems on some rockets and spacecraft, auxiliary source of power to maintain hydraulic pressure in aircraft, to name just a few of the areas of use.

Reactors presently employed for such technical applications as rocket thrusters and gas generators require extensive, expensive and difficult to refurbish catalytic surfaces to initiate and stabilize the reaction. Due to causes such as thermal shocks, thermal cycles, contaminating flow, the catalyst "beds" tend to mechanically/structurally deteriorate and/or become "poisoned" (loss of catalytic reactivity) thereby losing effectiveness. Further, operation of a catalyst bed reactor with most hydrazine blends is limited to single firings due to bed poisoning. In addition, the catalyst type reactor is not particularly efficient when used for pulsed or low flow rate operation.

Two other methods used to cause the hydrazine to react are: to have pyrotechnic energy release or to introduce a preheated gas flow into the reaction chamber. Heat from external source, i.e., chemical, pyrotechnic and/or electrical, raises the temperature of the reactor or a portion of the reactor such that the injected fluid such as hydrazine will vaporize and thermally decompose. Typically, a temperature of 400°–500°F. is needed to cause hydrazine to react. Once started, the reaction may be self-sustaining and the external heating may be terminated.

Direct electrical heating of the reactor will also provide sufficient temperature and energy for decomposition. Two previous attempts to provide reactors of the direct electrical heating type had significant limitations. In one, an exposed electrical filament was used to generate the heat. This filament was susceptible to degradation. The reactors were unable to operate for more than several minutes steady state without performance degrading heat sinking because of the temperature limitations of the electrical heater insulators. In this type reactor, the insulator constituted a portion of the reactor chamber wall. In addition, to insure insulator-structural integrity, the operating temperature was reduced by heat sinking (conduction of heat away from) the reactor to its support. The other uses a standard external filament (i.e., Nichrome heater element) and an internal semi-catalytic screen pack (typically platinum). Reactors featuring such screen packs have some of the disadvantages listed for the catalytic reactors.

The state-of-the-art of present hydrazine type reactors generally features small orifice injection of the liquid hydrazine for atomization or small droplet formation. The hydrazine liquid is injected through small ports or apertures having screens thereacross such that the liquid passing through the port or screen would essentially be atomized or broken up into small droplets. The small ports or screen have a life-limiting effect on the reactor since the small ports or screens will undergo degradation, sufficient at times to reduce and/or restrict input flow.

Accordingly, it is an object of this invention to provide an electrothermal reactor which will reduce or eliminate the aforelisted problems.

A further object of this invention is to provide an electrothermal reactor in which small port or screen atomization injection methods have been eliminated while still permitting effective atomization of the liquid.

And yet another object of this invention is to provide an electrothermal reactor in which the heating element is formed with an external metal cover over an insulator which encapsulates the filament heater.

A still further object of this invention is to provide an electrothermal reactor in which the fuel is injected into the reactor as a liquid wherein vaporization takes place within the reactor.

And yet a still further object of this invention is to provide an electrothermal reactor which uses atomizing injectors wherein the fuel is injected into the reaction chamber as a vapor.

SUMMARY OF THE INVENTION

An electrothermal reactor is described having particular utility for use with hydrazine type fuels. A heater is mounted within the reaction chamber of the reactor to raise the temperature within the chamber to the reaction temperature. A cover over the electrical filament provides support for and isolates the filament from the reaction product. Injection means are provided whereby the liquid fuel is vaporized within the chamber such that the vaporized fuel will react when the temperature within the chamber reaches the reaction temperature. Means may be included within the reactor to act as a reaction stabilizer.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which:

FIG. 1 is a sectional view of the electrothermal reactor of this invention;

FIG. 2 is a view taken along line 2—2 of FIG. 1;

FIG. 3 is a sectional view greatly enlarged taken along line 3—3 of FIG. 2 particularly showing the heat source in section;

FIG. 4 is a perspective view of a two-dimensional injector which may be utilized in place of the injector of FIG. 1;

FIG. 5 is a top view of the injector of FIG. 4;

FIG. 6 is a sectional view taken along lines 6—6 of FIG. 5;

FIG. 7 is a sectional view of a three-dimensional injector which may be utilized for the injector of FIG 1; and FIG. 8 is a perspective view of the first stage of the injector of FIG. 7.

DESCRIPTION OF ILLUSTRATED EMBODIMENTS

Reference is now made to FIGS. 1 and 2 of the drawings which illustrate one exemplary embodiment of the improved electrothermal reactor of this invention, which is designated generally by the reference numeral 10. The reactor 10 is comprised of a substantially cylindrical reactor body 12 being closed at the front end 14. The opposite end of the reactor body 12 defines a nozzle 16 through which the gases generated within the reactor body 12 exit. The walls of the reactor body 12 and front end 14 define a reaction chamber therewithin designated generally with the reference numeral 18.

A heat source designated generally as 20 is secured to the reactor body 12 and extends into the reaction chamber 18. In the embodiment herein shown it can be seen that the heat source is mounted in a substantially coaxial position with regard to the centerline of the reactor body 12. It may be noted, however, that the heat source 20 may have other orientations within the reaction chamber 18 and may be mounted by other means than as hereinbelow described.

The heat source 20 comprises a sheathed filament heater 22 which is wrapped as a coil or cartridge in order to obtain the desired power to surface temperature ratio and heat distribution within the reactor 10. As seen in FIG. 3, the heater 22 is formed with an external metal cover or sheath 24 over an insulating material 26 which encapsulates the filament heater 28. The metal sheath 24 provides support for and isolates the filament 28 from the reaction products. Structural integrity of the electrical insulator 26 is no longer required as it does not constitute any portion of the reactor housing or body. This permits use and operation of high temperature insulating materials which do not limit operating temperatures or steady state conditions. This has also eliminated the requirement for the performance degrading heat sinking. The heater 20 is supported on any suitable post or the like 30 which serves as the mounting structure for securing the heat source 20 within the reaction chamber 18. It can be seen with a heat source of the type herein described that the heat source 20 will keep the central portion of the reaction chamber 18 rather hot while a certain amount of heat will radiate outwardly to the walls of the reactor body 12. The support post(s) 30 also serves the function of picking up waste heat and transferring such heat to the walls of the reactor body front end portion 14. Further this same support post(s) and heater serve as a reaction stabilizer and a heat path from the reaction zone to the chamber wall in self-sustaining reactor operation after reaction start.

The body 12 is formed with an aperture 32 therethrough. The axis of the aperture is slightly off normal relative to the wall. A suitable injection tube 34 is supported in the bore 32. The liquid fuel, such as hydrazine or the like, is delivered through the tube 34 for injection into the reactor 10. Atomization and vaporization of the fuel are achieved by causing the incoming fluid (shown generally by arrows 36) to follow a helical path so as to "hug" the reactor chamber wall. This is accomplished by injecting the fluid 36 slightly off the normal, i.e., tangentially, to the curved inner surfaces of body 12 such that the fluid is forced into continual contact with the wall by centrifugal loading. The fuel 36 is injected into the reactor 10 with a high velocity such that the injected liquid is acted on by approximately 1,000 G's which push the liquid against the wall as it continues its helical path around the inner wall of body 12. With the liquid 36 hugging the wall due to the centrifugal loading, a spreading and shearing of the liquid occurs. As previously indicated, there is heat radiated from the heat source 22 outwardly to warm the wall of the body 12. As the liquid 36 continues its helical path, it is forced into continual contact with a substantially fresh heat transfer surface as the liquid progresses along the body 12. As the liquid progresses along its path the smeared and sheared-forming droplets obtain sufficient energy from the wall to vaporize and subsequently flow to the vortex in the chamber 18. The vaporized fuel thus swirls around the heater 22 which is maintaining the central temperature at the fuel reaction temperature since there has been little heat loss except for waste heat in the vaporization process. The heat source 20 is thus able to cause the vaporized fuel to heat to its reaction temperature. Once the reaction or ignition of the vaporized fuel begins, the reactor 10 may be considered self-sustaining.

The hydrazine liquid will begin to vaporize at temperatures approximately 400°–500°F. The radiated heat from the source 20 at the walls of the body 12 together with the heat and energy generated by the shearing action of the liquid against the wall is sufficient to provide vaporization of the liquid fuel. The temperature required for reaction to occur is approximately 1200°–1300°F. Once the reaction occurs, the temperature about the heat source 20 rises to approximately 1800°–2000°F. As a result, a significantly greater amount of heat radiation is being fed back to the wall area to cause the vaporization of the injected liquid. It should be noted that the injected liquid, during the process of its helical path and vaporization, acts to cool the reactor wall and thereby protect it from full exposure to the hot reaction products. The outer wall of the body 12 can have temperatures ranging about 1000°–1100°F. as a result of the cooling of the walls by the liquid. Hence, the resultant cooler reactor body decreases the thermal losses from the reactor 10. The helical centrifugal stratification of the liquid fuel and gas prevents premature expulsion of unreacted liquid and permits more efficient operation with a smaller reactor volume or chamber 18. Because of the wall atomizing technique used herein the injector tube bore may be larger than the atomizing injectors used for bed reactors.

It may be desirable to incorporate an additional reaction stabilizer within the chamber 18. In the embodiment herein described such a reaction stabilizer is provided by mounting a screen 38 about the heat source 20. The screen 38 is supported at one end by suitable means such as screens, tubes or the like 40, such screen 40 being attached to the body 12. The function of the screen 38 is to provide a reaction stabilization area and to transfer some of the reaction energy back to the wall of body 12 for self-sustaining operation. The screen may also be used for the conduction of superheating from internal or external heaters to the reacting fluid with slight modifications of the body 12. Although a cylindrical screen type stabilizer has been described herein in the preferred embodiment, it is obvious that the orientation of the stabilizer and its shape and configuration may be varied depending on the configuration and parameters of the respective reactor body.

In some instances it may be desirable to have axial fuel injection rather than the tangential injection as hereinabove described. The axial injection may be through a single or plural injector as diagrammatically shown in phantom in FIG. 1. In this example, the fuel is delivered to the injector nozzles 42 by injection tubes 44. The injectors 42 are supported within suitable apertures formed in the end wall 14 of the body 12.

With an axial type injector it is desirable and necessary that the fuel which enters the reaction chamber 18 be in an essentially vaporized state. Thus, the vaporization must occur at the injector nozzle. Referring now to FIGS. 4–6, a two-dimensional axial injector designated generally as 46 is shown which will permit vaporization of the fuel passing therethrough. The injector 46 comprises a substantially triangular body 48. The apex 50 of the triangular body 48 is curved around so as to define a continuous curvilinear surface 52. The injection tube 44 passes through an aperture in the wall of body 48 and is secured to the apex 50. Thus, the liquid fuel, such as hydrazine, from tube 44 impinges upon the body 48 at the apex 50. The fuel is injected at a substantially high velocity, as hereinbefore described, wherein the smearing and shearing action again takes place as the liquid fuel progresses in expanding fan-like fashion along the inner surface 52 of the body 48. The body 48 may be preheated to assist in the vaporization process of the liquid fuel, represented by arrows 54, as the fuel progresses along the injector body 48. Due to the centrifugal loading and spreading of the liquid fuel 54, the fuel will leave the lip or edge 55 of the body 48 in atomized form, represented generally by the arrows 56, thereby entering the reaction chamber 18 in proper form for the reaction first described. It can be seen that the atomized fuel 56 exits in a plane parallel with the direction of the injected liquid fuel 54.

Another exemplary embodiment of an axial injector is illustrated in FIG. 7. The injector designated generally as 58 represents a three-dimensional axial injector. The liquid fuel, such as hydrazine 60, exits from the injection tube 44 at a substantially high velocity into the first stage of the injector 58. The first stage of the injector 58 comprises a substantially dome-shaped member 62 in which the dome is pulled inwardly to define an impingement point 64. The injection tube 44 is axially aligned with the impingement point 64 such that the fuel 60 engages the point 64. Because of the high velocity of the fuel 60, the fuel will move along the dome-shaped member 62 in an expanding 360° fashion.

The second stage of the injector 58 comprises a semi-torus member 66. It is seen that the peripheral edge 68 of the dome-shaped member 62 is slightly larger in diameter than the diameter of the inner peripheral edge 70 of the semi-torus member 66. Thus, the fuel 60 will leave the peripheral edge 68 of the body 62 to immediately impinge upon the inner wall surface of the semi-torus member 66 at the inner edge. As previously described, the smearing and shearing effect on the liquid fuel 60 will occur during the first and second stage such that the fuel will leave the outer peripheral lip 72 in atomized form, which is represented by arrows 74.

Due to the temperatures involved in the electrothermal reactor of the type herein described, suitable materials for the reactor body, metal sheath for the heater, stabilizer screen and injector must be properly selected. Two examples of materials which would be suitable to withstand such temperatures are molybdenum and molybdenum alloys containing zirconium. It is obvious that other materials could be utilized.

It can be seen that an electrothermal reactor has been described which overcomes the objections of the prior art devices. The electrothermal reactor of this invention provides for effective vaporization of the liquid fuel and subsequent heating of the fuel to reaction temperature in an efficient and effective manner. Accordingly, the objectives hereinbefore set forth have been accomplished.

While present exemplary embodiments of this invention have been illustrated and described, it will be recognized that this invention may be otherwise variously embodied and practiced by those skilled in the art.

What is claimed:

1. An electrothermal reactor for use with hydrazine type liquid fuels comprising:
   a reactor body having one end closed and a nozzle formed at the other end of said reactor body, said reactor body, closed end and nozzle defining a reaction chamber therewithin;
   a curvilinear surface associated with said body;
   a heat source mounted within said reaction chamber, said heat source maintaining the central portion of said reaction chamber at a reaction temperature while some heat energy is radiated outwardly to said body surface;
   fuel injection means for injecting a liquid fuel tangential to said curvilinear surface; and
   means mounted in said reaction chamber to define a reaction stabilizer area within said chamber.

2. The reactor as set forth in claim 1 in which said means comprises a screen mounted about said heat source in spaced relation thereto, said screen being supported between said heat source and said reactor body; and
   support means connected with said screen, said support means being secured to said reactor body wherein support means transmits some heat energy outwardly to said reactor body.

3. The reactor as set forth in claim 2 further comprising a screen supported in spaced relation about said metal cover; and
   support means secured to said reactor body for mounting said screen in said reaction chamber wherein said screen provides a reaction stabilizing area.

4. The reactor as set forth in claim 1 in which said curvilinear surface is an injector nozzle, said nozzle being mounted in the wall of said reactor body in communication with said reaction chamber and in which said fuel injection means is an injection tube associated with said nozzle for injecting fluid into said nozzle.

5. The reactor as set forth in claim 4 in which said injection nozzle comprises a substantially triangular-shaped member, the apex of said member being curved around so as to define a continuous curvilinear surface, said injection tube extending through the curved surface of said member so as to inject the liquid fuel against said curvilinear surface at the apex of said member wherein the fuel progresses along said curvilinear surface in an expanding fan-like fashion such that vaporized and atomized fuel is projected from the lip of said triangular member in a plane substantially parallel with said injection tube and into said reaction chamber.

6. The reactor as set forth in claim 5 in which said heat source is a sheathed filament heater wrapped as a coil, said heater comprising an insulating means encapsulating said heater filament; and a metal sheath surrounding said insulating means.

7. The reactor as set forth in claim 6 in which said injector nozzle is mounted in said closed end wherein the vaporized and atomized fuel is transmitted into said reaction chamber in an axial direction relative to said reactor body and further comprising a reaction stabilizer mounted in said reaction chamber between said heater and reactor body.

8. The reactor as set forth in claim 4 in which said injector nozzle comprises a two-stage three-dimensional injector, said first stage comprising a substantially dome-shaped member in which said dome portion is pulled inwardy to define an impingement point, said injection tube being axially aligned with said impingement point such that liquid fuel is injected against said point wherein said fuel will move along said depressed dome-shaped member in an expanding 360° curved path;

said second stage comprising a semi-torus member, the inner peripheral lip of such being slightly less in diameter than the diameter of the peripheral lip of said dome-shaped member wherein fuel leaving said dome-shaped member will engage said semi-torus member and move therealong in an expanding 360° path.

9. The reactor as set forth in claim 8 in which said heat source is a sheathed filament heater wrapped as a coil, said heater comprising an insulating means encapsulating said heater filament; and a metal sheath surrounding said insulating means.

10. The reactor as set forth in claim 9 in which said injector nozzle is mounted in said closed end wherein the vaporized and atomized fuel is transmitted into said reaction chamber in an axial direction relative to said reactor body and further comprising a reaction stabilizer mounted in said reaction chamber between said heater and reactor body.

11. The reactor as set forth in claim 4 further comprising a plurality of injector nozzles being mounted in said reactor body closed end for injecting multiple streams of vaporized and atomized fuel into said reaction chamber in an axial direction relative to said reactor body.

12. An electrothermal reactor for use with hydrazine type liquid fuels comprising:

a reactor body having one end closed and a nozzle formed at the other end of said reactor body, said reactor body, closed end and nozzle defining a reaction chamber therewithin;

a heat source mounted within said reaction chamber, said heat source maintaining the central portion of said reaction chamber at a reaction temperature while some heat energy is radiated outwardly to said body surface;

means for injecting fuel into said reaction chamber; and means mounted adjacent to said heat source in said reaction chamber to define a reaction stabilizer area within said chamber.

13. A reactor as defined in claim 12 in which said stabilizer means comprises a screen mounted about the heat source in spaced relation thereto, said screen being supported by the heat source and the reactor body.

* * * * *